(12) United States Patent
Mizuta

(10) Patent No.: US 6,674,185 B2
(45) Date of Patent: Jan. 6, 2004

(54) TEMPERATURE SENSOR CIRCUIT HAVING TRIMMING FUNCTION

(75) Inventor: Masaru Mizuta, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/286,294

(22) Filed: Nov. 4, 2002

(65) Prior Publication Data
US 2003/0086476 A1 May 8, 2003

(30) Foreign Application Priority Data
Nov. 8, 2001 (JP) .................... 2001-343574

(51) Int. Cl.[7] .............................. G01K 7/01
(52) U.S. Cl. .................... 307/651; 374/1; 374/170; 374/178; 327/512; 327/378
(58) Field of Search .................... 374/178, 170, 374/171, 172, 163, 13; 327/512, 378; 307/651

(56) References Cited

U.S. PATENT DOCUMENTS

| | | | | |
|---|---|---|---|---|
| 4,165,642 A | * | 8/1979 | Lipp | 374/170 |
| 5,838,578 A | * | 11/1998 | Pippin | 327/512 |
| 6,008,685 A | * | 12/1999 | Kunst | 327/512 |
| 6,084,462 A | * | 7/2000 | Barker | 327/512 |
| 6,097,239 A | * | 8/2000 | Miranda et al. | 374/178 |
| 6,140,860 A | * | 10/2000 | Sandhu et al. | 374/178 |
| 6,183,131 B1 | | 2/2001 | Holloway et al. | 374/172 |
| 6,337,603 B1 | * | 1/2002 | Kinugasa et al. | 331/66 |
| 6,554,469 B1 | * | 4/2003 | Thomson et al. | 374/178 |

FOREIGN PATENT DOCUMENTS

JP 2001013011 A * 1/2001 ............ G01K/7/00

OTHER PUBLICATIONS

Inada et al., English Language Abstract of JP 2001013011 A, Derwent Accession No. 2001-176263 (2002).*

* cited by examiner

Primary Examiner—Diego Gutierrez
Assistant Examiner—Stanley J. Pruchnic, Jr.
(74) Attorney, Agent, or Firm—Oblon, Spivak, McClelland, Maier & Neustadt, P.C.

(57) ABSTRACT

A temperature sensor circuit includes a temperature detecting circuit, a preset value storing circuit, and a current supplying circuit. The temperature detecting circuit is configured to generate a first temperature voltage in accordance with an ambient temperature and a current. The preset value storing circuit stores a second temperature voltage preset for a predetermined ambient temperature as a digital value. The current supplying circuit supplies the current to the temperature detecting circuit. The current supplying circuit supplies the current such that the first temperature voltage generated by the temperature detecting circuit at the predetermined ambient temperature is equal to the second temperature voltage.

16 Claims, 12 Drawing Sheets

| Voltage VF (ideal) [V] | Temperature[°C] | Digital data |
|---|---|---|
| 8.00 | −65 | 11111111 |
| ⋮ | ⋮ | ⋮ |
| 7.00 | −45 | 11100000 |
| ⋮ | ⋮ | ⋮ |
| 6.00 | −15 | 11000000 |
| ⋮ | ⋮ | ⋮ |
| 5.00 | 5 | 10100000 |
| ⋮ | ⋮ | ⋮ |
| 4.00 | 25 | 10000000 |
| ⋮ | ⋮ | ⋮ |
| 3.50 | 35 | 01110000 |
| ⋮ | ⋮ | ⋮ |
| 3.25 | 40 | 01101000 |
| ⋮ | ⋮ | ⋮ |
| 3.00 | 45 | 01100000 |
| ⋮ | ⋮ | ⋮ |
| 2.00 | 65 | 01000000 |
| ⋮ | ⋮ | ⋮ |
| 1.00 | 85 | 00100000 |
| ⋮ | ⋮ | ⋮ |
| 0.00 | 105 | 00000000 |

TEMPERATURE SENSOR CIRCUIT HAVING TRIMMING FUNCTION

CROSS-REFERENCE TO RELATED APPLICATIONS

This application is based upon and claims the benefit of priority from the prior Japanese Patent Application No. 2001-343574, filed Nov. 8, 2001, the entire contents of which are incorporated herein by reference.

BACKGROUND OF THE INVENTION

1. Field of the Invention

The present invention relates to a temperature sensor, and more particularly to a digital temperature sensor circuit having a trimming function.

2. Description of the Related Art

Temperature sensors are widely used in many fields, such as household electrical appliances and medical appliances. In recent years, they are also used in mobile communication equipment, for example, cellular phones. There are many types of temperature sensors, and it is important that they offer sufficient performance required in the respective fields.

Figure 1A:
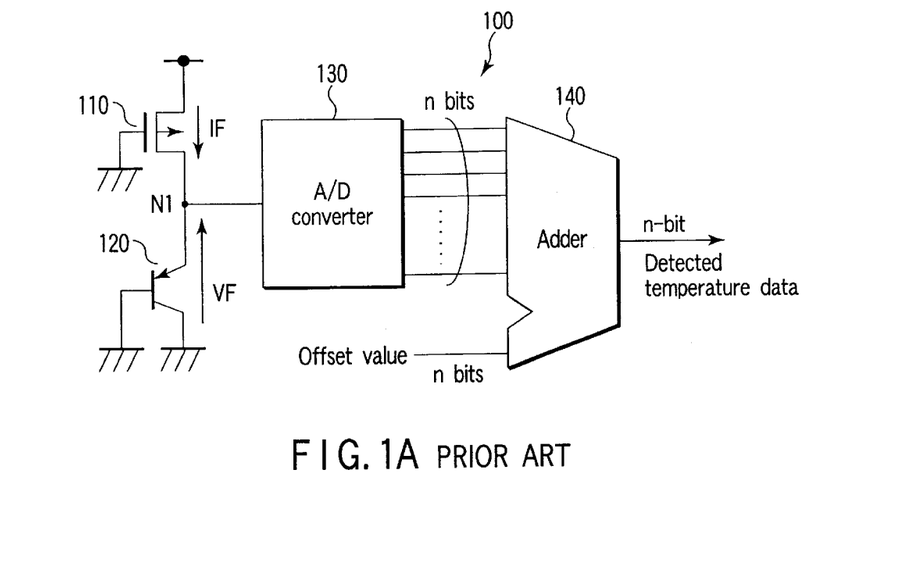
FIG. 1A is a block diagram showing the structure of a conventional temperature sensor circuit.

A conventional temperature sensor will be described with reference to FIG. 1A. FIG. 1A is a block diagram showing a structure of a digital temperature sensor circuit.

As illustrated in FIG. 1A, a temperature sensor circuit 100 includes a PMOS transistor 110, pnp bipolar transistor 120, an A/D converter 130 and an adder 140. The transistor 110 functions as a current source, which supplies a current IF to the transistor 120. The transistor 120, whose base and collector are connected in common, functions as a diode. It outputs a temperature voltage VF in accordance with the current IF and the ambient temperature. The A/D converter 130 analog-to-digital converts the temperature voltage VF and outputs n-bit digital data. The adder 140 adds the digital data output from the A/D converter 130 to an offset value, which is also n-bit digital data. The adder 140 externally outputs the addition result as detected temperature data.

Figure 1B:
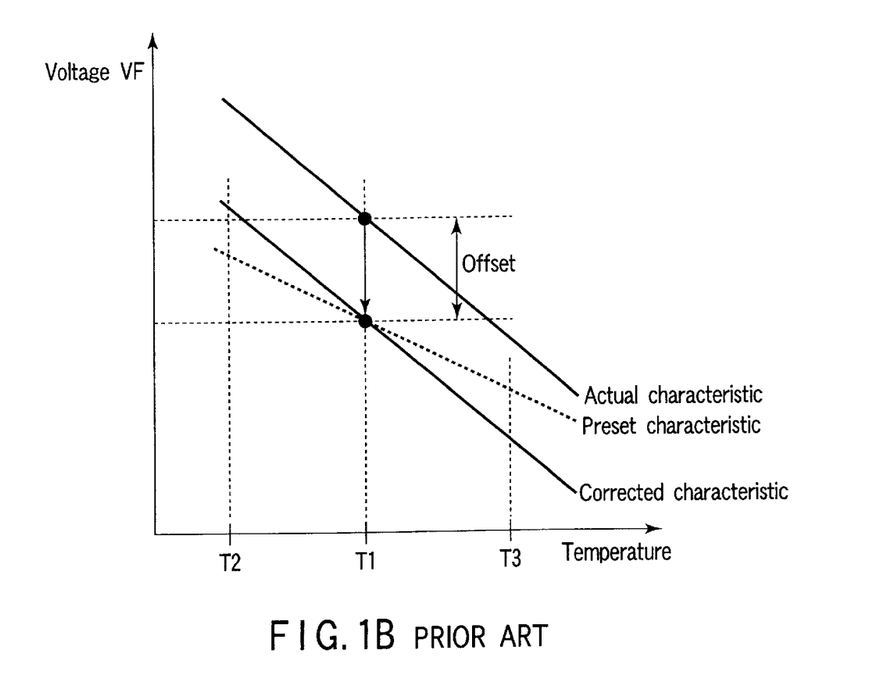
FIG. 1B is a characteristic diagram showing the relationship between a temperature and a temperature voltage in the temperature sensor circuit shown in FIG. 1A.

Thus, the illustrated temperature sensor circuit senses a temperature utilizing the fact that the voltage VF generated in the transistor 120 varies depending on the temperature. The offset value is data to correct the characteristic of the transistor 120. The characteristic correction of the transistor 120, utilizing the offset value, will be described with reference to FIG. 1B. FIG. 1B is a graph showing the dependence of the temperature voltage VF on temperature.

The transistor 120 is designed and manufactured so as to generate a preset temperature voltage VF at every point of temperature. It is assumed that the line "preset characteristic" in FIG. 1B represents the preset temperature voltages. However, the dependence of the temperature voltage VF on temperature may be deviated from the original setting under the influence of manufacturing variations. It is assumed that the line "actual characteristic" in FIG. 1B represents the actual temperature voltages. Therefore, it is necessary to correct the deviation from the preset value (this correction is called trimming).

The trimming is performed as follows. In the example shown in FIG. 1B, the difference between the actual temperature voltage VF and the preset temperature voltage at a temperature T1 is measured. The difference value obtained by the measurement is converted to digital data and stored as the offset value in a memory of the temperature sensor circuit. When a temperature is detected, the offset value is added to digital data output from the A/D converter 130 and the addition result is output as detected temperature data.

As described above, the offset value determined in advance is added to an actual measurement value, thereby correcting the characteristic variations of the transistor 120, so that the temperature can be sensed accurately.

However, the trimming function of the conventional temperature sensor circuit described above does not always offer sufficient correcting performance. According to the conventional method, the set temperature voltage and the actual temperature voltage at a temperature (temperature T1) are compared, and the difference therebetween is set as an offset value. The offset value is added to the actual temperature voltage VF, thereby correcting the variations in characteristic. In other words, "trimming" means parallel translation of the line representing the actual characteristic of the temperature voltage VF in FIG. 1B so as to coincide with the line representing the preset characteristic. Therefore, if the two lines of characteristics are different in gradient, they cannot coincide with each other except for the point of the temperature T1. More specifically, as shown in FIG. 1B, when the preset characteristic and the corrected characteristic are compared, the temperature voltages VF of the two characteristics coincide only at the temperature T1, but they are completely different at the other temperatures (T2, T3).

As described above, in the conventional temperature sensor, the offset value is added to the detected value to carry out trimming, without correcting the actual temperature voltage VF itself. Therefore, if the gradient of the actual characteristic of the dependence of the temperature voltage is different from that of the preset characteristic, the correction cannot be made satisfactorily. In this case, the accuracy of detecting a temperature may deteriorate.

BRIEF SUMMARY OF THE INVENTION

A temperature sensor circuit according to an aspect of the present invention comprises:
- a temperature detecting circuit configured to generate a first temperature voltage in accordance with an ambient temperature and a current;
- a preset value storing circuit which stores a second temperature voltage preset for a predetermined ambient temperature as a digital value; and
- a current supplying circuit which supplies the current to the temperature detecting circuit, such that the first temperature voltage generated by the temperature detecting circuit at the predetermined ambient temperature is equal to the second temperature voltage.

A method for adjusting a temperature sensor circuit according to another aspect of the present invention comprises:
- storing a first temperature voltage of a digital value corresponding to a predetermined temperature in a first storing circuit;
- setting a control signal of a digital value to cause a current supplying circuit to supply a current;
- converting an ambient temperature to a second temperature voltage based on the ambient temperature and the current;
- controlling the current to equalize the first and second temperature voltages; and
- storing in a second storing circuit the control signal which causes the current supplying circuit to supply the current that equalizes the first and second temperature voltages.

DETAILED DESCRIPTION OF THE INVENTION

Figure 2:
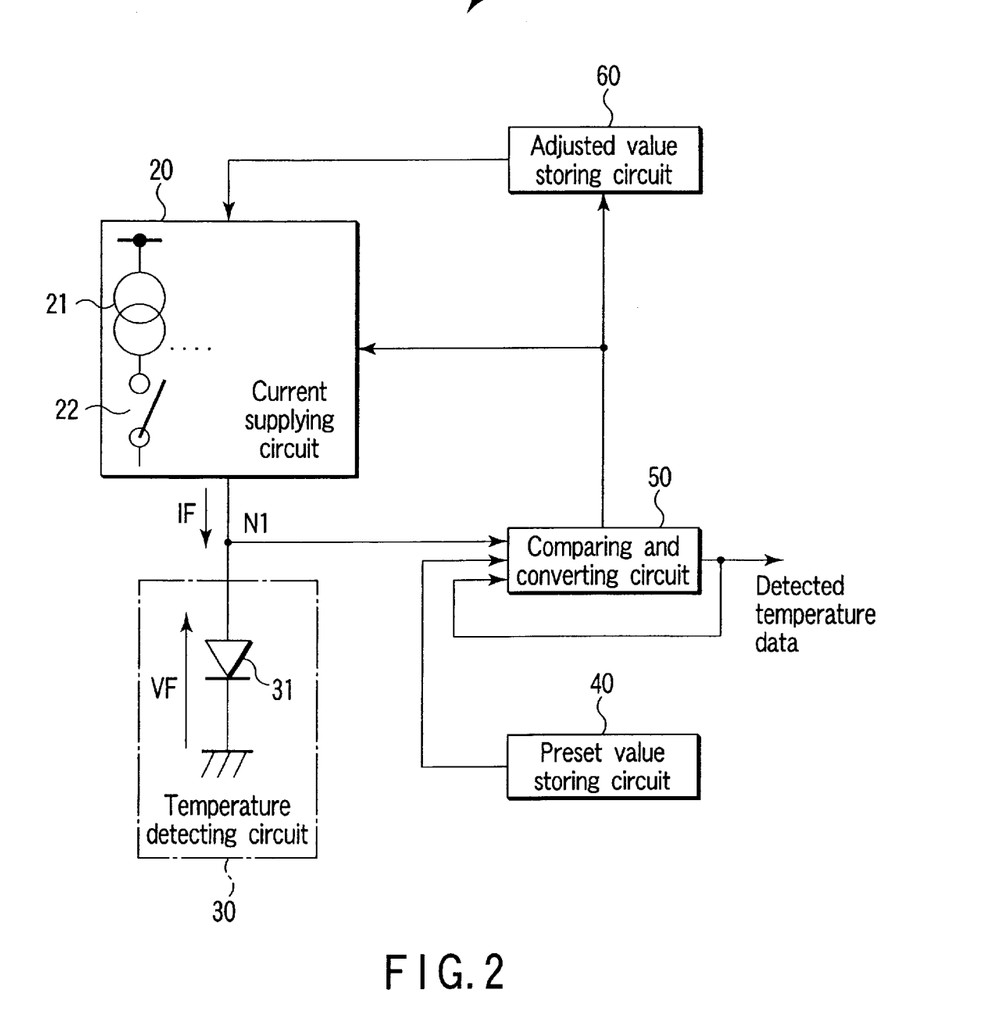
FIG. 2 is a block diagram showing the structure of a temperature sensor circuit according to an embodiment of the present invention.

A temperature sensor circuit and a method for adjusting the temperature sensor circuit, according to an embodiment of the present invention, will be described with reference to FIG. 2. FIG. 2 is a block diagram of a temperature sensor circuit having a trimming function.

As shown in FIG. 2, the temperature sensor circuit 10 includes a current supplying circuit 20, a temperature detecting circuit 30, a preset value storing circuit 40, a comparing and converting circuit 50 and an adjusted value storing circuit 60.

The current supplying circuit 20 includes a plurality of current sources 21 and switches 22 for controlling the current sources 21. It outputs a current IF to an output node N1.

The temperature detecting circuit 30 comprises, for example, a diode 31, whose anode is connected to the node N1 and whose cathode is grounded. It generates a temperature voltage VF in accordance with the current IF and an ambient temperature T.

The preset value storing circuit 40 is, for example, a nonvolatile semiconductor memory, which stores a preset temperature voltage set in advance for a predetermined temperature.

The comparing and converting circuit 50 compares the current temperature voltage VF with past temperature data in the normal operation, and outputs data corresponding to the comparison result as detected temperature data (current temperature). In the trimming operation, it compares the temperature voltage VF with the preset temperature voltage stored in the preset value storing circuit 40. Based on the comparison result, it controls the current IF supplied from the current supplying circuit 20, so that the temperature voltage VF is equal to the preset temperature voltage, and outputs control signal.

The adjusted value storing circuit 60 is, for example, a nonvolatile semiconductor memory, which stores the control signal (adjustment value) to make the temperature voltage VF equal to the preset temperature voltage in the trimming operation.

Figure 3:
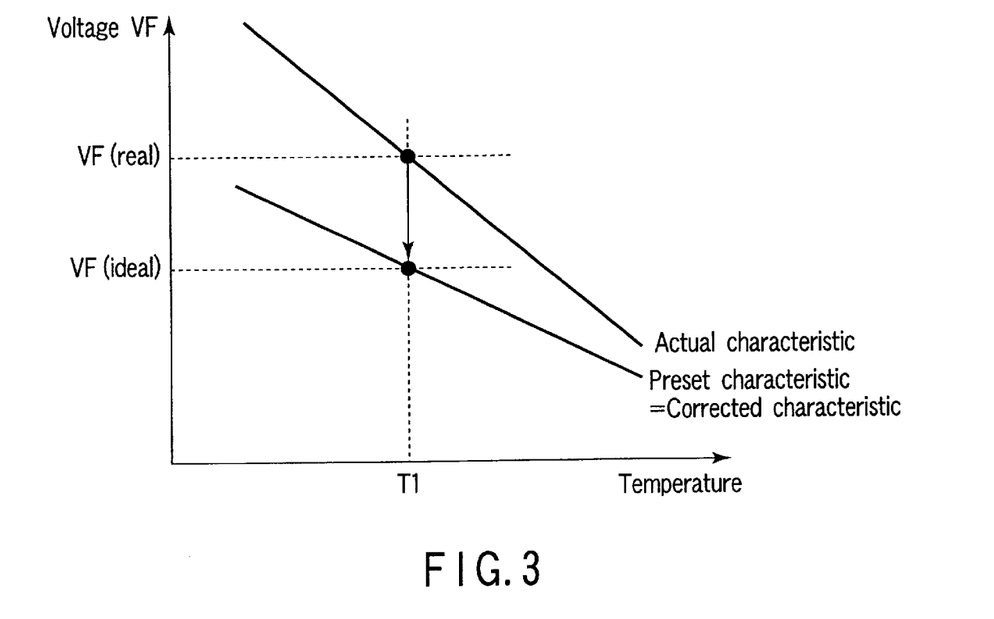
FIG. 3 is a characteristic diagram showing the relationship between a temperature and a temperature voltage in the temperature sensor circuit according to the embodiment of the present invention.

The trimming operation of the above temperature sensor circuit will be described with reference to FIGS. 2 and 3. FIG. 3 is a diagram showing the relationship between a temperature and a temperature voltage VF. As shown in FIG. 3, it is assumed that the temperature characteristic of the temperature voltage VF actually generated by the diode 31 (the graph indicated as "actual characteristic") is different from the preset temperature characteristic (the graph indicated as "preset characteristic"). In the following description, VF (real) represents the temperature voltage actually detected by the temperature detecting circuit 30 and VF (ideal) represents the preset ideal temperature voltage.

First, the preset temperature voltage VF (ideal) at a temperature T1 is stored in the preset value storing circuit 40. The temperature voltage VF (ideal) at only a single point of temperature suffices. Then, the comparing and converting circuit 50 compares the temperature voltage VF (real) actually detected by the diode 31 at the temperature T1 with the preset temperature voltage VF (ideal) stored in the preset value storing circuit 40. The comparing and converting circuit 50 then issues a control signal in accordance with the comparison result to the current supplying circuit 20. Based on the control signal, the current supplying circuit 20 controls the value of the supplied current IF, so that the temperature voltage VF (real) generated by the diode is equalized to the preset temperature voltage VF (ideal). The adjusted value storing circuit 60 stores the control signal which makes VF (real) equal to VF (ideal). In other words, the adjusted value storing circuit 60 stores operation conditions of the current supplying circuit 20 to generate the current IF that makes VF (real) equal to VF (ideal).

As described above, the trimming operation carries out correction to make the actual temperature voltage VF (real) at the temperature T1 equal to the preset temperature voltage VF (ideal) by controlling the current IF.

The normal operation will now be described. In the normal operation, the current supplying circuit 20 supplies to the temperature detecting circuit 30 the current IF in accordance with the control signal stored in the adjusted value storing circuit 60 in the trimming operation. The diode 31 of the temperature detecting circuit 30 outputs the temperature voltage VF (real) in accordance with the current IF and the ambient temperature. The comparing and converting circuit 50 compares the temperature voltage VF (real) with the output from the comparing and converting circuit 50 at the immediately preceding time, and externally outputs the comparison result as detected temperature data.

With the temperature sensor circuit described above, the temperature voltage VF (real) at the predetermined temperature is corrected so as to be equal to the preset temperature voltage VF (ideal) by controlling the value of the current IF. The trimming by controlling the current IF allows correction of not only the temperature voltage VF at the temperature T1 but also the gradient of the temperature characteristic, as shown in FIG. 3. Consequently, the detection accuracy of the temperature sensor circuit can be improved.

Figure 4A:
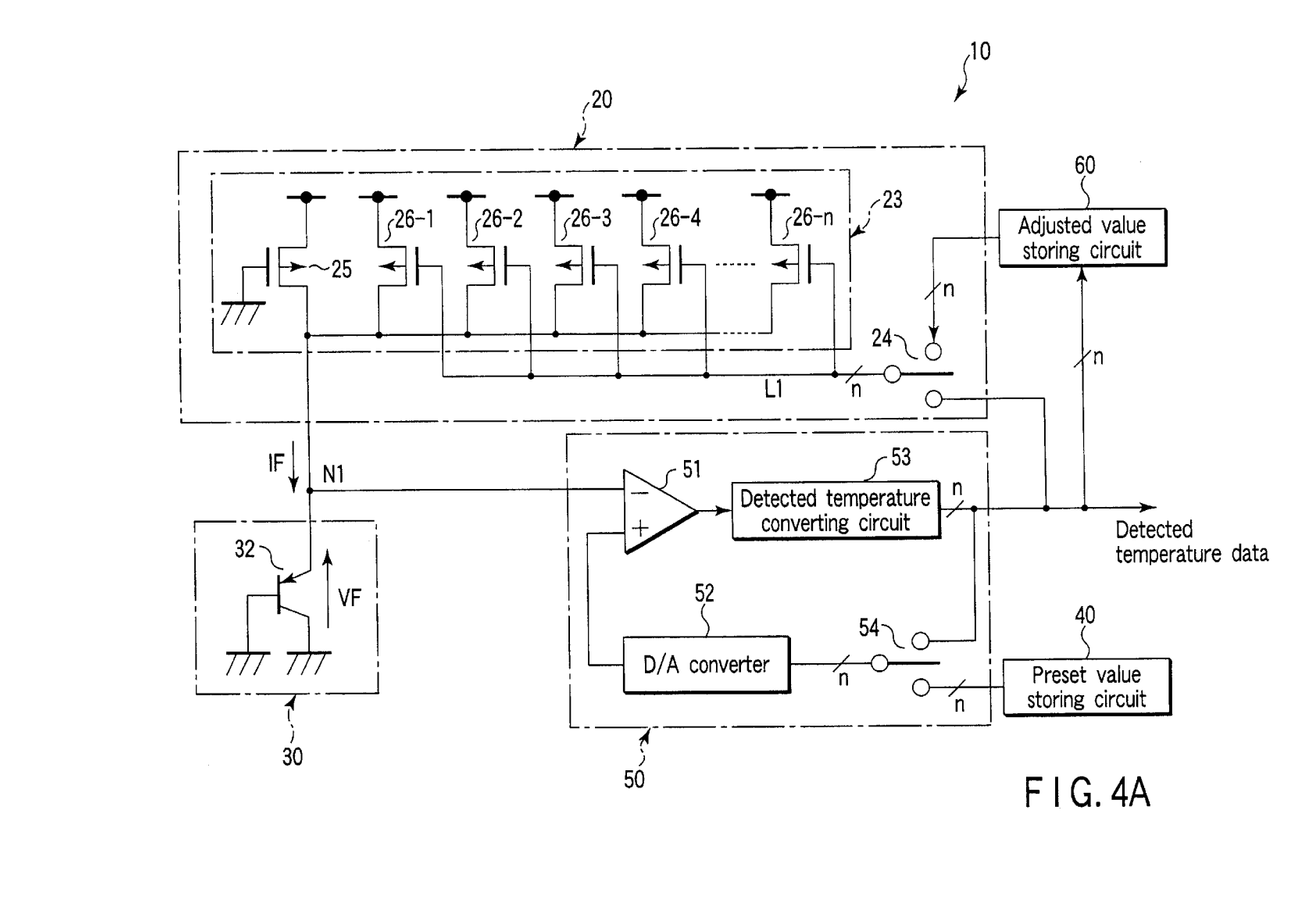
FIG. 4A is a block diagram showing in more detail the structure of the temperature sensor circuit shown in FIG. 2A.

The structure and operation of the above temperature sensor circuit will be described in more detail with reference to FIG. 4A. FIG. 4A is a block diagram showing details of the structure of the digital temperature sensor circuit having the trimming function shown in FIG. 2.

As shown in FIG. 4A, the current supplying circuit 20 comprises a current source circuit 23 and a switch 24. The current source circuit 23 has a pMOS transistor 25 and pMOS transistors 26-1 to 26-n. The source of the pMOS transistor 25 is connected to the power source and the gate thereof is grounded. The pMOS transistor 25 is normally on. The sources of the n-number of pMOS transistors 26-1 to 26-n are connected to the power source and the gates thereof are connected to a signal line L1, which transmits an n-bit digital signal. Signals corresponding to the respective bits of the digital signal transmitted through the signal line L are input to the gates of the respective transistors 26-1 to 26-n. The drains of the pMOS transistor 25 and the pMOS transistor 26-1 to 26-n are connected to a common connecting node. The current IF is output through the common connecting node of the drains. The switch 24 switches between the output of the comparing and converting circuit 50 and the output of the adjusted value storing circuit 60 to be connected to the signal line L1. Thus, the transistor 25 supplies the minimum current IF and the transistors 26-1 to 26-n add extra-current to the minimum current.

The diode 31 of the temperature detecting circuit 30 is, for example, a pnp bipolar transistor 32, whose base and collector are grounded and whose emitter is connected to an output node of the current supplying circuit 20. The voltage between the emitter and the collector of the transistor 32 is the temperature voltage VF (real), which varies depending on the current IF and the ambient temperature. The temperature voltage VF (real) is taken out through the connection node N1 between the emitter of the transistor 32 and the output node of the current supplying circuit 20.

The preset value storing circuit 40 stores the value of the preset temperature voltage VF (ideal) at the temperature T1 as n-bit digital data (preset value).

The comparing and converting circuit 50 is an A/D converter circuit of successive approximation type, which includes a comparator 51, a D/A converter 52, a detected temperature converting circuit 53 and a switch 54. The comparator 51 compares the temperature voltage VF (real) detected at the node N1 with analog data output from the D/A converter 52. The detected temperature converting circuit 53 outputs n-bit digital data corresponding to the result of the comparison by the comparator 51. Details of the process in the detected temperature converting circuit 53 will be described later. The detected temperature converting circuit 53 outputs the detected temperature as the n-bit digital data in the normal operation. The D/A converter 52 converts the digital data output from the preset value storing circuit 50 or the detected temperature converting circuit 53 to analog data. The switch 54 switches between the output of the detected temperature converting circuit 53 and the output of the preset value storing circuit 40 to be connected to the input to the D/A converter 52.

The adjusted value storing circuit 60 stores n-bit digital data output from the detected temperature converting circuit 53 in the trimming operation.

Figure 4B:
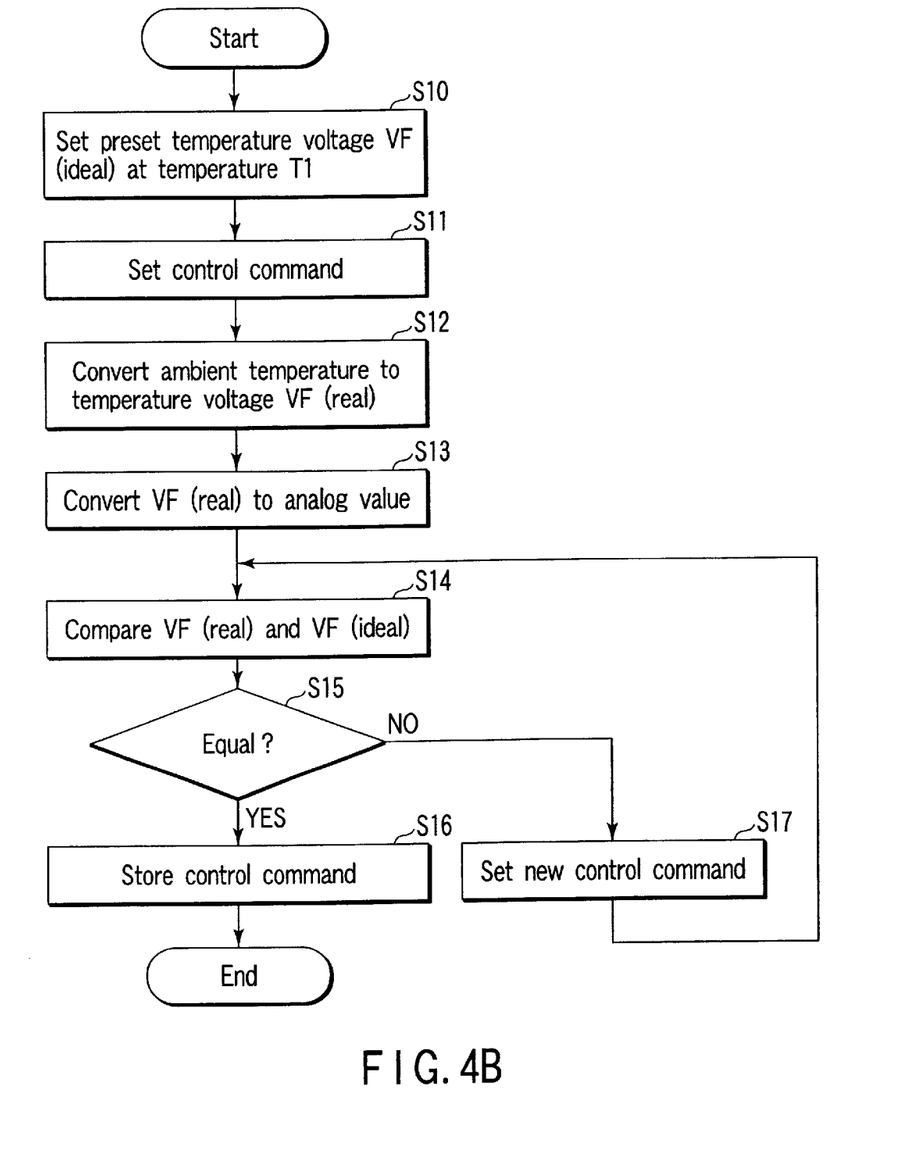
FIG. 4B is a flowchart showing the flow of a trimming operation of the temperature sensor circuit according to the embodiment.
Figure 4C:
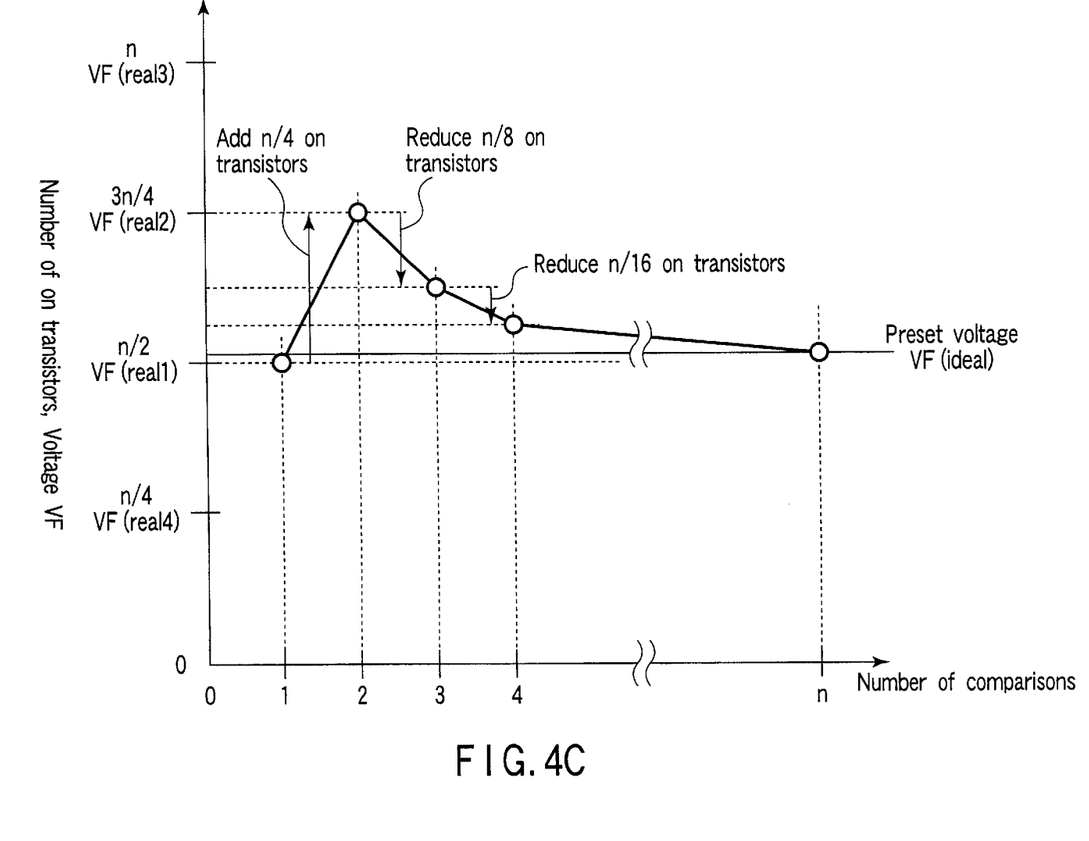
FIG. 4C is a characteristic diagram showing a change of the temperature voltage during the trimming operation in the temperature sensor circuit according to the embodiment.

An operation of the temperature sensor circuit having the above structure will now be described. First, the trimming operation will be described. The trimming operation is carried out by adjusting the current value IF with a bisection algorithm, by use of the preset value in the preset value storing circuit 40 as a reference voltage of the comparing and converting circuit 50, so that the temperature voltage VF (real) output from the transistor 32 can be equal to the preset temperature voltage VF (ideal). The adjustment of the current IF with the bisection algorithm will be described with reference to FIGS. 4A to 4C. FIG. 4B is a flowchart showing the flow of the trimming operation. FIG. 4C is a characteristic diagram for explaining the bisection algorithm, which shows the relationship between the number of comparisons and the number of on transistors along with the temperature voltage VF.

First, the n-bit digital data (preset value) corresponding to the preset temperature voltage VF (ideal) at the temperature T1 is stored in the preset value storing circuit 40 (a step S10). A control signal for the current supplying circuit 20 is set in the detected temperature converting circuit 53 (a step S11). The control signal is also n-bit digital data. In the current supplying circuit 20, half of the n-number (n/2) of pMOS transistors 26-1 to 26-n are on as the default setting in accordance with the control signal. To carry out trimming, the signal line L1 is connected to the output node of the detected temperature converting circuit 53 by means of the switch 24, and the input node of the D/A converter 52 is connected to the output node of the preset value storing circuit 40 by means of the switch 54. Then, the ambient temperature is set to the temperature T1.

The temperature detecting circuit 30 converts the ambient temperature to the temperature voltage VF (real) (a step S12). The D/A converter 52 digital-to-analog converts the preset value stored in the preset value storing circuit 40 (a step S13). The preset temperature voltage VF (ideal) obtained by the D/A conversion is input to one of the input terminals of the comparator 51. The actual temperature voltage VF (real) is output to the node N1 and then input to the other input terminal of the comparator 51. The actual temperature voltage VF (real), which is detected at the node N1 when the ½ n-number of pMOS transistors 26-1 to 26-n are on, is represented by VF (real1). The comparator 51 compares the temperature voltages VF (real) and VF (ideal) (a step S14).

Assume that the preset temperature voltage VF (ideal) and the actual temperature voltage VF (real1) have the relationship VF (real1)<VF (ideal), as shown in FIG. 4C (a step S15). In this case, the detected temperature converting circuit 53 sets a new control signal based on the comparison result (a step S17). In the current supplying circuit 20, a ¼ n-number of pMOS transistors are additionally turned on in accordance with the control signal, so that a ¾ n-number of pMOS transistors as a whole are on. As a result, the current IF increases and the temperature voltage VF (real) generated by the transistor 32 rises. The temperature voltage, which is detected at the node N1 at this time, is represented by VF (real2). The comparator 51 compares the temperature voltages VF (real2) and VF (ideal). Assume that the comparison result is VF (real2)>VF (ideal). In this case, the detected temperature converting circuit 53 turns off a ⅛ n-number of transistors of the ¾ n-number of on transistors, so that a ⅝ n-number of pMOS transistors as a whole are on. As a result, the current IF decreases and the temperature voltage VF (real) generated by the transistor 32 lowers. Subsequently, the comparator compares the temperature voltage at the node N1 in this state with the preset temperature voltage. If they are not equal, a 1/16 n-number of transistors are added or reduced and then the temperature voltage at the node N1 is compared with the preset temperature voltage. This process (the steps S14, S15 and S17) is repeated until the actual temperature voltage VF (real) becomes equal to the preset temperature voltage VF (ideal).

As described above, each time the number of on transistors is increased or reduced by the bisection algorithm, the actual temperature voltage VF (real) is compared with the preset temperature voltage VF (ideal). Thus, the actual temperature voltage VF (real) gradually approaches the preset temperature voltage VF (ideal). When the actual temperature voltage VF (real) becomes equal to the preset temperature voltage VF (ideal), the control signal (adjusted value) corresponding to the number of pMOS transistors 26-1 to 26-n, which satisfies the requirement VF (real)=VF (ideal), is stored in the adjusted value storing circuit 60 based on a write signal (a step S16).

Figure 4D:
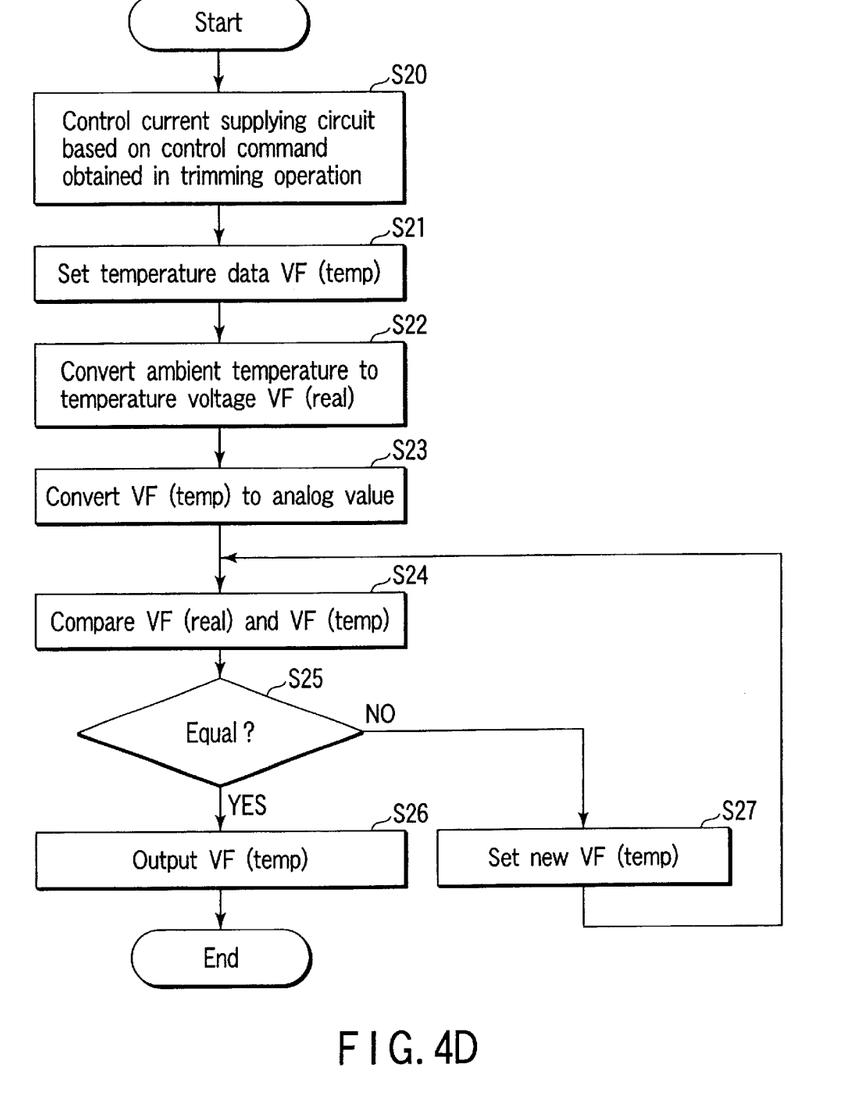
FIG. 4D is a flowchart showing the flow of a normal operation of the temperature sensor circuit according to the embodiment.

The normal operation will now be described with reference to FIG. 4D. FIG. 4D is a flowchart showing the flow of the normal operation. In the normal operation, the signal line L1 is connected to the output node of the adjusted value storage circuit 60 by means of the switch 24, and the input node of the D/A converter 52 is connected to the output node of the detected temperature converting circuit 53 by means of the switch 54.

First, the current supplying circuit 20 is controlled on the basis of the adjusted value stored in the adjusted value storing circuit 60 in the trimming operation (a step S20). More specifically, of the n-number of pMOS transistors 26-1 to 26-n included in the current source circuit 23, only the transistors designated by the adjusted value are turned on, thereby controlling the current IF. Therefore, the temperature voltage VF (real) generated by the transistor 32 is equal to the preset temperature voltage VF (ideal).

In this state, the comparing and converting circuit 50 outputs as detected temperature data the n-bit digital data obtained by analog-to-digital converting the temperature voltage VF (real). The process carried out by the comparing and converting circuit 50 in the normal operation is basically the same as that in the trimming operation, although the comparator 51 uses the corrected temperature voltage VF (real) detected at the node N1 as a reference voltage.

More specifically, first, a temporary temperature data VF (temp) is set to the detected temperature converting circuit 53 (a step S21). The temperature data VF (temp) is also n-bit digital data. At a time immediately after the trimming, the temperature data VF (temp) may be the control signal itself. The temperature detecting circuit 30 converts the ambient temperature to the temperature voltage VF (real) (a step S22). The D/A converter converts the temperature data VF (temp) to an analog value (a step S23).

Thereafter, the n-bit digital data obtained by the detected temperature converting circuit 53 is equalized to a value corresponding to the temperature voltage VF (real) by means of the bisection algorithm based on the temperature voltage VF (real) (steps S24, S25 and S27). The temperature voltage VF (temp) of the n-bit digital data, which is equal to the temperature voltage VF (real), is output from the detected temperature converting circuit 53 as detected temperature data.

Figure 5A:
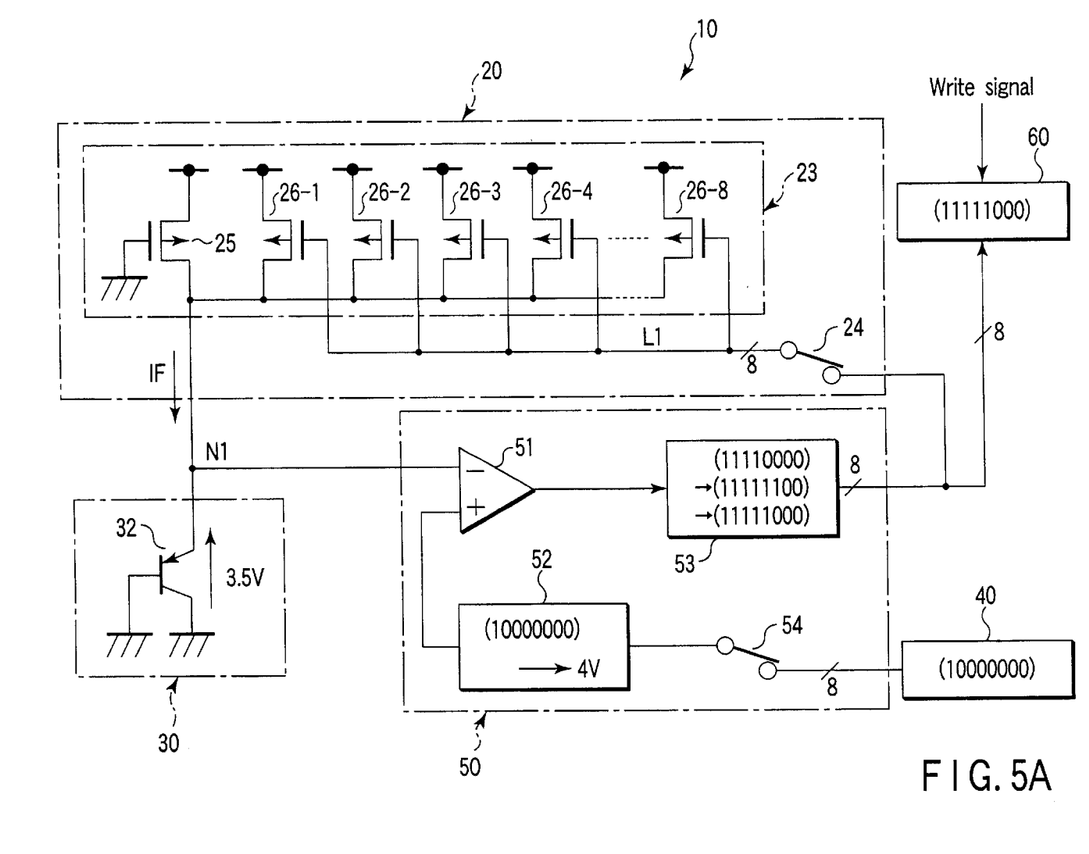
FIG. 5A is a block diagram showing a substantial structure of the temperature sensor circuit shown in FIG. 4A in the trimming operation.
Figure 5B:
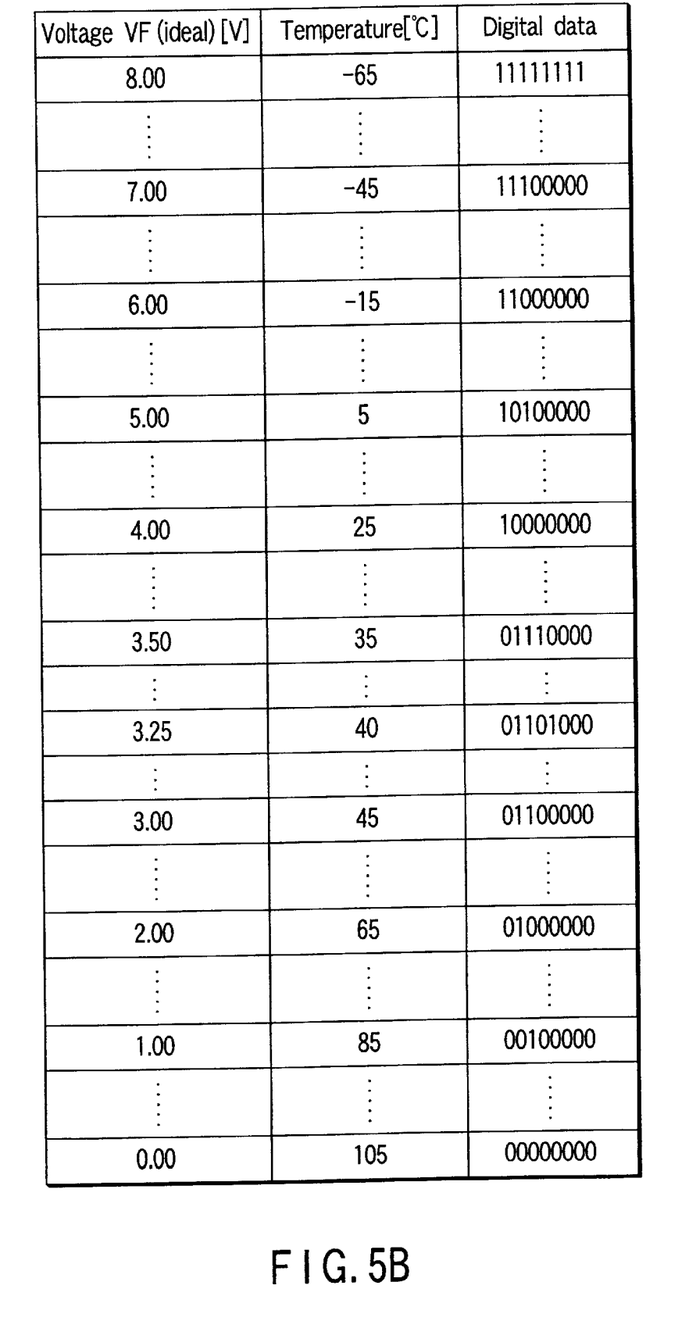
FIG. 5B is a diagram showing the relationship among a voltage, temperature and digital data in the temperature sensor circuit.

The operation of the temperature sensor circuit of this embodiment will be described in more detail. FIG. 5A is a block diagram showing a substantial structure of the temperature sensor circuit in the trimming operation. To make the explanation simple, FIG. 5A shows the case n=8 (n: the number of pMOS transistors 26-1 to 26-n). FIG. 5B shows the relationship among a preset temperature voltage VF (ideal), ambient temperature and digital data set in advance in the temperature sensor circuit. The preset temperature voltage varies from 0.00V to 8.00V, the corresponding ambient temperatures are 105° C. to −65° C. and the digital data corresponding to the respective temperatures are "00000000" to "11111111". As an example, the case of trimming at the ambient temperature of 25° C. will be described below.

As shown in FIG. 5B, the digital data corresponding to the ambient temperature of 25° C. is "10000000". This 8-bit digital data is stored in the preset value storing circuit 40 as a preset value.

Data "11110000" is stored in the detected temperature converting circuit 53 as a control signal to control the current supplying circuit 20. This is a default value for carrying out trimming. The bits, from the highest order bit, respectively correspond to control signals for the transistors 26-1 to 26-8. The data "1" represents the on state, and the data "0" represents the off state. Accordingly, the data "11110000" means the half of the 8 pMOS transistors 26-1 to 26-8, i.e., the four transistors 26-1 to 26-4 are on, while the other transistors 26-5 to 26-8 are off.

The ambient temperature is set to 25° C. The signal line L1 is connected to the output node of the detected temperature converting circuit 53 by means of the switch 24, and the input node of the D/A converter 52 is connected to the output node of the preset value storing circuit 40 by means of the switch 54.

The preset value "10000000" in the preset value storing circuit 40 is converted to analog data by the D/A converter 52. Naturally, the A/D conversion is performed so as to meet the relationship shown in FIG. 5B. The preset value "10000000" is converted to 4V and input to one of the input terminal ("plus terminal") of the comparator 51. The temperature voltage VF (real) detected at the node N1 is input to other input terminal ("minus terminal") of the comparator 51. It is assumed that the actual temperature VF (real) at the ambient temperature 25° C. is not equal to the preset temperature voltage VF (ideal)=4V, but 3.5V.

Figure 5C:
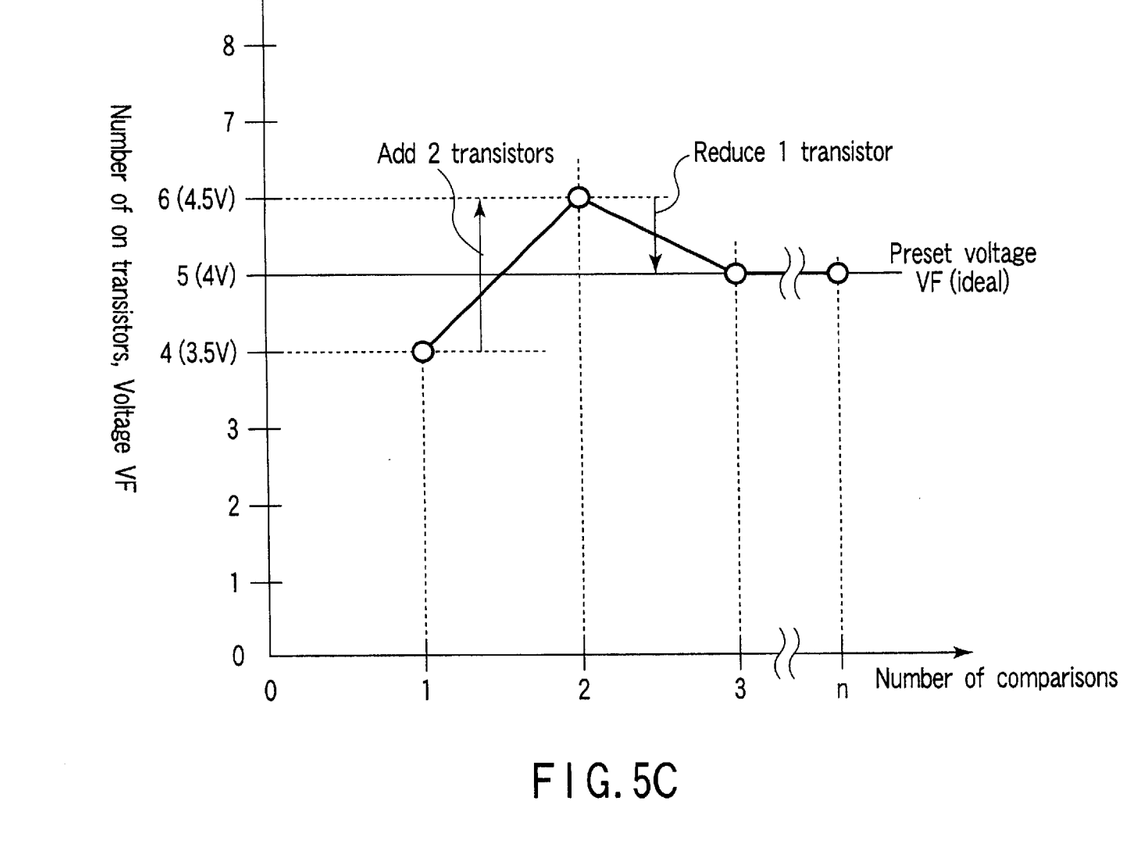
FIG. 5C is a characteristic diagram showing a change of the temperature voltage during the trimming operation in the temperature sensor circuit shown in FIG. 5A.

In this case, the comparing and converting circuit 50 starts a process to equalize the temperature voltage VF (real) to the preset temperature voltage VF (ideal) based on the bisection algorithm described above. FIG. 5C is a characteristic diagram for explaining the process, and shows the relationship between the number of comparisons performed by the comparator and the number of on transistors along with the temperature voltage VF. As shown in FIG. 5C, when the current IF supplied from the current supplying circuit 20 is of a default value (when the four transistors 26-1 to 26-4 are on), VF (real) is smaller than VF (ideal) (the number of comparisons=1). Therefore, it is necessary to increase the number of on transistors to increase the current IF. Accordingly, the detected temperature converting circuit 53 turns on two additional transistors, which corresponds to ¼ of all pMOS transistors. Thus, the six transistors 26-1 to 26-6 as a whole are on, so that the temperature voltage VF (real) is increased. That is, the detected temperature converting circuit 53 generates the control signal "11111100".

When the six transistors 26-1 to 26-6 are turned on, the current IF increases and the temperature voltage VF (real) rises. It is assumed that the resultant temperature voltage VF (real) exceeds the preset temperature voltage (ideal)=4V, to, for example, 4.5 V (the number of comparison=2). In this case, since it is necessary to decrease the current IF, the detected temperature converting circuit 53 turns off one transistor, which corresponds to ⅛ of all pMOS transistors. Thus, the five transistors 26-1 to 26-5 as a whole are on, so that the temperature voltage VF (real) is decreased. That is, the detected temperature converting circuit 53 generates the control signal "11111000". As a result, the temperature voltage VF (real) is lowered to 4V, which is equal to the preset temperature voltage VF (ideal). Consequently, the control signal "11111000" to make the temperature voltage VF (real) equal to the preset temperature voltage VF (ideal) is stored as an adjusted value in the adjusted value storage circuit 60 based on a write signal.

The trimming operation is thus completed.

Figure 5D:
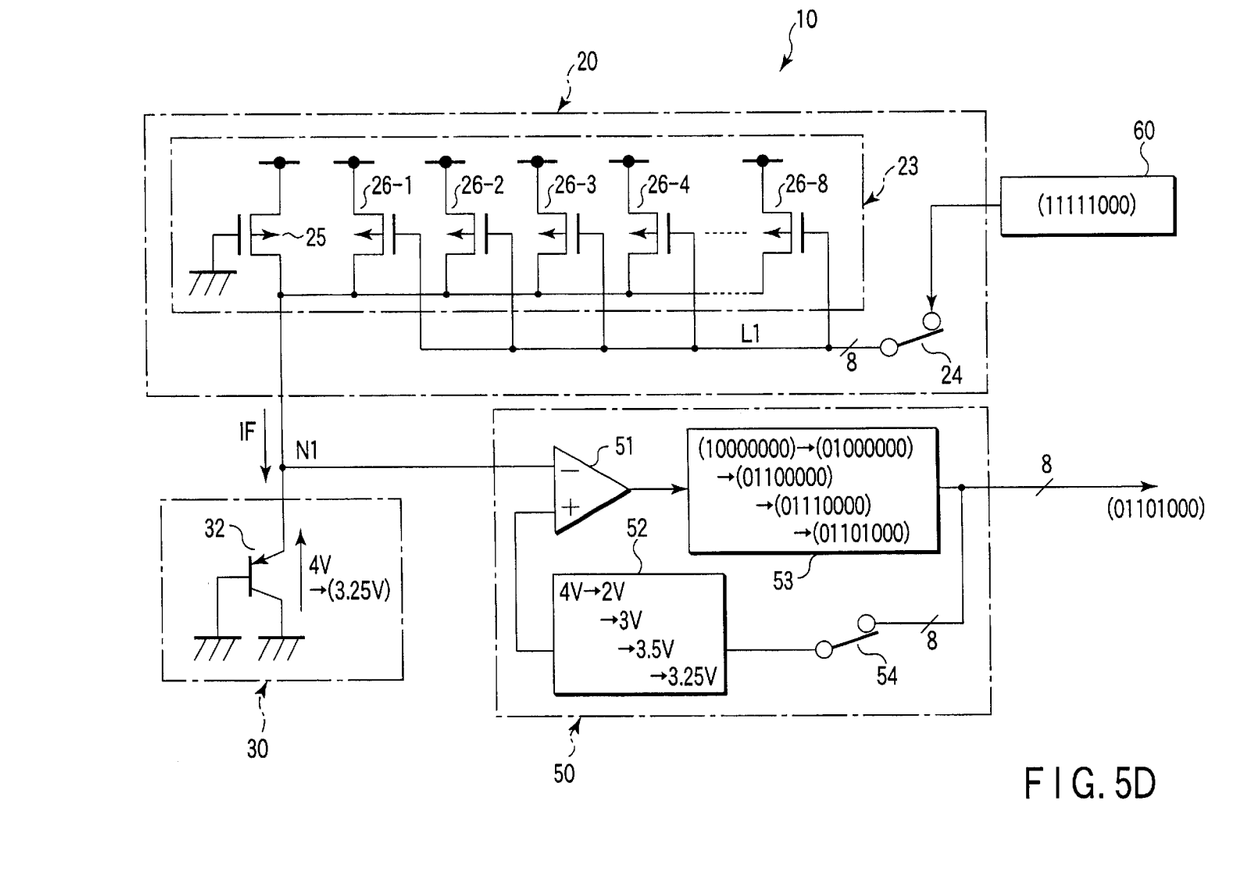
FIG. 5D is a block diagram showing a substantial structure of the temperature sensor circuit shown in FIG. 4A in the normal operation.

The normal operation will now be described with reference to FIGS. 5B and 5D. FIG. 5D is a block diagram showing a substantial structure of the temperature sensor circuit in the normal operation. As an example, the case of operation when the ambient temperature is changed from 25° C. to 40° C. will be described below.

The signal line L1 is connected to the output node of the adjusted value storage circuit 60 by means of the switch 24, and the input node of the D/A converter 52 is connected to the output node of the detected temperature converting circuit 53 by means of the switch 54. The adjusted value storing circuit 60 stores the adjusted value "11111000" obtained in the trimming operation described above. Accordingly, of the eight pMOS transistors 26-1 to 26-8 in the current source circuit 23, the five pMOS transistors 26-1 to 26-5 are on, while the three pMOS transistors 26-6 to 26-8 are off. In this state, the temperature voltage VF (real) output from the transistor 32 is corrected to the preset temperature voltage VF (ideal).

The detected temperature converting circuit 53 stores the digital data "10000000" at the ambient temperature of 25° C. This data can be considered the default value of the temperature data. The data is converted to 4V by the D/A converter 52, and input to the one of the input terminal of the comparator 51. Further, the temperature voltage VF (real)=4V (the preset voltage at 25° C.), detected at the node N1, is input to the other input terminal of the comparator 51.

It is assumed that, under these conditions, the ambient temperature changes from 25° C. to 40° C., and accordingly the temperature voltage VF (real) at the node N1 changes from 4V to 3.25V.

Figure 5E:
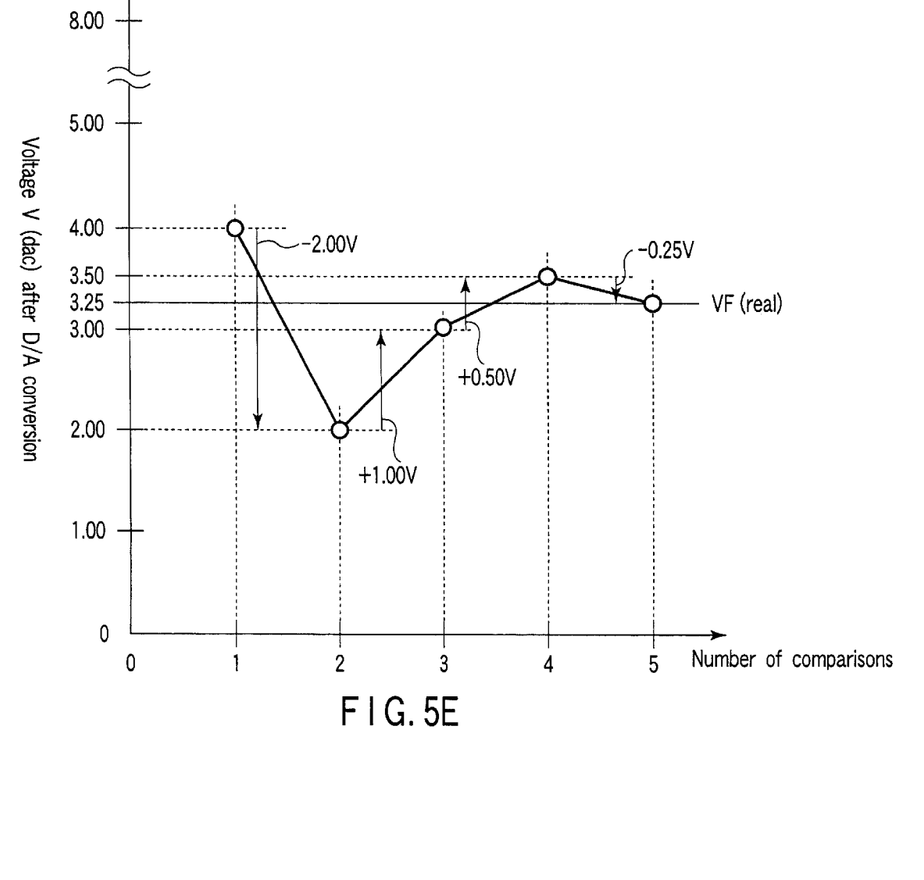
FIG. 5E is a characteristic diagram showing a change in voltage output from a D/A converter during the normal operation in the temperature sensor circuit shown in FIG. 5D.

In this case, the comparing and converting circuit 50 starts a process to cause the detected temperature converting circuit 53 to output digital data corresponding to the temperature voltage VF (real) based on the bisection algorithm described above. FIG. 5E is a characteristic diagram for explaining the process, which shows the relationship between the number of comparisons performed by the comparator and the voltage (output voltage V (dac) from the D/A converter 52) corresponding to the detected temperature data of the digital value output from the detected temperature converting circuit 53.

Initially, the detected temperature data output from the D/A converter 52 is 4V (V (dac)) corresponding to 25° C. Therefore, when the actual temperature voltage VF (real) is lowered to 3.25V, the result of the comparison at the comparator 51 is V (dac)>VF (real) (the number of comparison=1). Since, in the normal operation, V (dac) must be equal to VF (real), it is necessary to reduce V (dac). As shown in FIG. 5B, the amplitude Vp-p of V (dac) is 8V.

Therefore, the voltage (2V) corresponding to ¼ of the amplitude is reduced from the initial value (4V) of V (dac), that is, V (dac) is set to 2V. For this purpose, the detected temperature converting circuit 53 generates the digital data "01000000" corresponding to V (dac)=2V.

Then, the D/A converter 52 digital-to-analog converts the above data "01000000", and inputs the analog data to the one of the input terminal of the comparator 51. The result of the comparison by the comparator 51 is: the output voltage V (dac) of the A/D converter=2V<the temperature voltage VF (real)=3.25V (the number of comparisons=2). Therefore, it is now necessary to increase the value of V (dac). The voltage (1V) corresponding to ⅛ of the amplitude Vp-p of V (dac) is added to the voltage V (dac)=2V. Then, the detected temperature converting circuit 53 generates the digital data "01100000" corresponding to the increased value of V (dac)=3V (2V+1V).

Further, the D/A converter 52 digital-to-analog converts the above data "01100000", and inputs the analog data to the one of the input terminal of the comparator 51. The result of the comparison by the comparator 51 is: the output voltage V (dac) of the A/D converter=3V<the temperature voltage VF (real)=3.25V (the number of comparisons=3). Thus, the output voltage V (dac) is still smaller than the temperature voltage VF (real). Therefore, it is necessary to further increase the value of V (dac). Accordingly, the voltage (0.5V) corresponding to ¹⁄₁₆ of the amplitude Vp-p of V (dac) is added to the voltage V (dac)=3V. Then, the detected temperature converting circuit 53 generates the digital data "01110000" corresponding to the increased value of V (dac)=3.5V (3V+0.5V).

The D/A converter 52 digital-to-analog converts the above data "01110000", and inputs the analog data to the one of the input terminal of the comparator 51. The result of the comparison by the comparator 51 is: the output voltage V (dac) of the A/D converter=3.5V>the temperature voltage VF (real)=3.25V (the number of comparisons=4). Therefore, it is now necessary to reduce the value of V (dac). The voltage (0.25V) corresponding to ¹⁄₃₂ of the amplitude Vp-p of V (dac) is reduced from the voltage V (dac). Then, the detected temperature converting circuit 53 generates the digital data "01101000" corresponding to V (dac)=3.25V (3.5V−0.25V).

As a result of the above process, the relationship V (dac)=V (real) is satisfied, and the detected temperature converting circuit 53 outputs the digital data "01101000" corresponding to the current temperature 40° C. as detected temperature data.

The temperature sensor circuit of the above structure and operation controls the value of the current flowing through the diode. With this control, the temperature voltage itself, detected at the diode, is corrected to be equal to the preset temperature voltage. Therefore, the dependence of the temperature voltage on temperature can coincide substantially completely with the setting over all temperature range only by adjusting the temperature voltage at a point of temperature to the preset temperature voltage. As a result, the temperature detecting accuracy of the temperature sensor circuit can be improved. Further, since the operation of the temperature sensor circuit can be controlled by using a digital signal, the temperature sensor circuit can be very easily incorporated into a digital device. In addition, since the adjusted values and the preset values can be set as digital data, the trimming accuracy can be improved.

The above embodiment is not the one and only embodiment of the present invention but various modifications can be made. More specifically, each of the circuits constituting the temperature sensor circuit may have variations, and the circuit configuration is not limited to those shown in the accompanying drawings. The configurations of the current supplying circuit 20 and the temperature detecting circuit 30 are not limited to those shown in the drawings. The comparing and converting circuit 50 may be formed of any circuit so far as it functions as an A/D converter of successive approximation type. The control of the current source circuit 23 in the trimming operation may be carried out in the same process as in the normal operation. In the above embodiment, the respective bits of an adjusted value to control the current source circuit 23 correspond to control signals for the respective pMOS transistors. However, an n-bit adjusted value may be treated as a single control signal. More specifically, the setting may be such that, when the amount of current supplied according to the adjusted value "00000000" is IF, the amounts of current supplied according to the adjusted values "00000001", "00000010", . . . and "11111111" are 2·IF, 3·IF, and . . . 129·IF respectively. In this case, the trimming may be performed by increasing or decreasing the amount of current per se by ½ of the current each time.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A temperature sensor circuit comprising:
    a temperature detecting circuit configured to generate a first temperature voltage in accordance with an ambient temperature and a current;
    a preset value storing circuit which stores a second temperature voltage preset for a predetermined ambient temperature as a digital value; and
    a current supplying circuit which supplies the current to the temperature detecting circuit, such that the first temperature voltage generated by the temperature detecting circuit at the predetermined ambient temperature is equal to the second temperature voltage.

2. A temperature sensor circuit having a trimming operation mode and a normal operation mode, comprising:
    a current supplying circuit which supplies a current;
    a temperature detecting circuit configured to generate a first temperature voltage in accordance with an ambient temperature and the current supplied from the current supplying circuit;
    a preset value storing circuit which stores a second temperature voltage preset for a predetermined ambient temperature as a digital value;
    a comparing and converting circuit configured to, in the trimming operation mode, compare the first temperature voltage generated by the temperature detecting circuit at the predetermined ambient temperature with the second temperature voltage, and generate a control signal of a digital value which controls the current supplying circuit so as to equalize the first and second temperature voltages; and
    an adjusted value storing circuit which stores the control signal to equalize the first and second temperature voltages.

3. The temperature sensor circuit according to claim 2, wherein:
    the comparing and converting circuit is configured to, in the normal operation mode, convert the first temperature voltage generated by the temperature detecting circuit to a digital value and output a result of conversion as detected temperature data; and
    the adjusted value storing circuit is configured to, in the normal operation mode, transmit the control signal to the current supplying circuit and adjust the current supplied from the current supplying circuit.

4. The temperature sensor circuit according to claim 2, wherein the comparing and converting circuit comprises:
    a comparator which compares the first temperature voltage with the second temperature voltage in the trimming operation mode;
    a temperature detecting converter which, in the trimming operation mode, generates the control signal which controls the current supplying circuit so as to supply the current that equalizes the first and second temperature voltages based on a result of comparison by the comparator; and
    a D/A converter which, in the trimming operation mode, converts the second temperature voltage stored in the preset value storing circuit to an analog value and inputs the analog value to the comparator.

5. The temperature sensor circuit according to claim 3, wherein the comparing and converting circuit comprises:
    a comparator which compares the first temperature voltage with the detected temperature data in the second operation mode;
    a temperature detecting converter configured to, in the normal operation mode, convert the detected temperature data to a digital value corresponding to the first temperature voltage based on a result of comparison by the comparator; and
    a D/A converter configured to, in the normal operation mode, convert the detected temperature data output from the temperature detecting converter to an analog value and input the analog value to the comparator.

6. The temperature sensor circuit according to claim 2, wherein the comparing and converting circuit is an A/D converter of successive approximation type which uses the second temperature voltage as a reference value in the trimming operation mode.

7. The temperature sensor circuit according to claim 3, wherein the comparing and convening circuit is an A/D convener of successive approximation type which uses the first temperature voltage as a reference value in the normal operation mode.

8. The temperature sensor circuit according to claim 2, wherein the current supplying circuit comprises a plurality of transistors, and adjusts a value of the current supplied therefrom in accordance with a number of transistors which are on.

9. The temperature sensor circuit according to claim 3, wherein the current supplying circuit comprises a plurality of transistors, and adjusts a value of the current supplied therefrom in accordance with a number of transistors which are on, and
    the current supplying circuit supplies the current that equalizes the first and second temperature voltages by the transistors which are turned on of a number corresponding to the control signal stored in the adjusted value storing circuit in the normal operating mode.

10. The temperature sensor circuit according to claim 8, wherein the current supplying circuit supplies the current that equalizes the first and second temperature voltages by adjustment of a number of the transistors which are on by the comparing and converting circuit in the trimming operation mode.

11. The temperature sensor circuit according to claim 2, wherein the temperature detecting circuit is a diode.

12. The temperature sensor circuit according to claim 2, wherein the preset value storing circuit and the adjusted value storing circuit are non-volatile semiconductor memories.

13. A method for adjusting a temperature sensor circuit comprising:

storing a first temperature voltage of a digital value corresponding to a predetermined temperature in a first storing circuit;

setting a control signal of a digital value to cause a current supplying circuit to supply a current;

converting an ambient temperature to a second temperature voltage based on the ambient temperature and the current;

controlling the current to equalize the first and second temperature voltages; and storing in a second storing circuit the control signal which causes the current supplying circuit to supply the current that equalizes the first and second temperature voltages.

14. The method for adjusting a temperature sensor circuit according to claim 13, wherein the controlling the current comprises:

converting the first temperature voltage to an analog value;

comparing the first and second temperature voltages; and if the first and second temperature voltages are unequal, after controlling the second temperature voltage by adjusting the control signal, repeating the converting the first temperature voltage to an analog data and the comparing the first and second temperature voltages.

15. The method for adjusting the temperature sensor circuit according to claim 13, further comprising:

after storing the control signal in the second storing circuit, setting temperature data of a digital value;

converting the ambient temperature to a third temperature voltage based on the current supplied from the current supplying circuit according to the control signal stored in the second storing circuit;

controlling the temperature data so that the temperature data is equal to the third temperature voltage; and outputting the temperature data equal to the third temperature voltage as a current temperature.

16. The method for adjusting the temperature sensor circuit according to claim 15, wherein the controlling the temperature data comprises:

converting the temperature data to an analog value;

comparing the temperature data with the third temperature voltage; and if the temperature data and the third temperature voltage are unequal, after adjusting the temperature data of a digital value, repeating the converting the temperature data to an analog value and the comparing the temperature data with the third temperature voltage.

* * * * *